United States Patent
Hsu

(10) Patent No.: US 6,282,494 B1
(45) Date of Patent: Aug. 28, 2001

(54) CUSTOMER-SETTLED VOICE NAVIGATION APPARATUS

(75) Inventor: James Hsu, Hsinchu (TW)

(73) Assignee: Holux Technology, Inc. (TW)

( * ) Notice: Subject to any disclaimer, the term of this patent is extended or adjusted under 35 U.S.C. 154(b) by 0 days.

(21) Appl. No.: 09/449,609

(22) Filed: Nov. 30, 1999

(30) Foreign Application Priority Data

Nov. 30, 1998 (TW) ................................................ 87119797

(51) Int. Cl.[7] .................................................. G01C 21/36
(52) U.S. Cl. ...................... 701/211; 701/213; 340/990; 340/995
(58) Field of Search ..................................... 701/200, 207, 701/208, 209, 211, 213; 340/988, 990, 995; 73/178 R

(56) References Cited

U.S. PATENT DOCUMENTS

| | | | | |
|---|---|---|---|---|
| 5,177,685 | * | 1/1993 | Davis et al. ........................... | 701/211 |
| 5,736,941 | * | 4/1998 | Schulte et al. ........................ | 701/211 |
| 5,774,071 | * | 9/1998 | Konishi et al. ....................... | 340/955 |
| 5,835,881 | * | 11/1998 | Trovato et al. ....................... | 340/988 |
| 5,850,618 | * | 12/1998 | Suetsugu et al. ..................... | 701/211 |
| 6,085,148 | * | 7/2000 | Jamison et al. ...................... | 701/207 |
| 6,104,980 | * | 8/2000 | Sato et al. ........................... | 701/211 |

* cited by examiner

Primary Examiner—Gary Chin
(74) Attorney, Agent, or Firm—Finnegan, Henderson, Farabow, Garrett & Dunner, L.L.P.

(57) ABSTRACT

A customer-settled voice navigation apparatus is disclosed which comprises a control unit, a satellite positioning signal receiving unit, a map data supply unit, a carte display unit, a navigating condition setting unit, an audio input unit, a navigating condition and information storage unit, a navigating condition comparing unit an audio output unit, and a voice output requiring unit. According to the invention, the user could settle any desired navigating information itself with respect to any location, area, timing, speed, height, and direction by means of an audio-recording manner at any place. Also, the invention could output audio navigating information previously recorded when the navigating condition designated by the user is matched.

10 Claims, 4 Drawing Sheets

CUSTOMER-SETTLED VOICE NAVIGATION APPARATUS

BACKGROUND OF THE INVENTION

1. Field of the Invention

This invention relates to a customer-settled voice navigation apparatus. More particularly, this invention relates to a customer-settled voice navigation apparatus which incorporates with functions of a global positioning system and a voice-recorder and can be settled by the customer as well as be applied to a car navigation device or a portable navigation device.

2. Description of the Prior Art

Upon the opening of radio communication systems and the progression of technique, radio communication has been popularized in light of the large demand. The opening of the global satellite positioning system (GPS) particularly leads to the development of another type of customized product A famous product which has applied the GPS technology is a car navigation device. By means of the car navigation device, a car driver can quickly ascertain where he is and can reach any place he wants via the most direct route which requires the least time.

Some of the conventional GPS navigation devices have been provided with a voice navigation function. However, the content of such a voice navigation is determined and set by manufacturer and therefore is incapable of being changed. Furthermore, such content may be not sufficient or suitable for practical use and thus cannot meet the user's requirements. In another type of navigation device, data in a text form can be inputted and then be shown to the user by voice via a so-called text-to-speech conversion technique. However, the content of such a data is also predetermined and set by the manufacturer and thus has the same problems as the fore-stated. More particularly, the sound of the voice may not be acknowledged by the user or may not appeal to the user.

SUMMARY OF THE INVENTION

The object of this invention is to provide a customer-settled navigation apparatus in which the user can settle any customized map navigation data with voice and the data being set can be outputted in his own voice to any place designated and thereby an effective and practical navigation apparatus is available.

To achieve the above object a customer-settled navigation apparatus to according to the present invention comprises a satellite positioning signal receiving unit for receiving a GPS signal; a signal control unit for executing signal control and data processing and obtaining a real-time condition including coordinate data representative of the place where the navigation apparatus is located and its related data in accordance with the GPS signal; a map data supply unit for supply to the control unit map data pertinent to the area in which the navigation apparatus is located; a carte display unit for showing the location of the navigation being imaged in the map in accordance with the coordinate data and the map data; a navigating condition setting unit for setting navigating condition; an audio input unit for inputting any navigating information corresponding to the navigating condition via voice; a navigation information storage unit for storing the voice navigating information; a navigating condition comparing unit for determining whether the navigating condition match the real-time condition; and an audio output unit for outputting corresponding voice navigating information stored in the storage unit according to the-navigating condition at the timing the navigating condition matches the real-time condition, According to the above construction, a user would be able to quickly input any desired navigating information by means of speaking and voice recording at any location and the navigation information will be automatically output to the user with voice. Thus, the user could pay fill attention to what he is doing, such as driving or walling. Moreover, the content of the voice navigation information can be changed at any time. Therefore, a customized, convenient and a customer-settled navigation apparatus is available.

In one preferred embodiment, this invention further comprises a navigation condition selection unit used for selecting the kind of the navigation condition to be set so as to input different kinds of navigating conditions. According to the preferred embodiment the user could settle any kind of navigating conditions he desires, such as location, time, speed, height, and direction, etc., according to his actual needs. Thus, the convenience of the navigation apparatus is progressed.

In another preferred embodiment, this invention further comprises an instant recording setting unit used to make the navigation apparatus serve as a message recorder so as to immediately perform an instant voice recording without setting a navigation condition.

In another further preferred embodiment this invention further comprises a voice output requiring unit for checking the content of the navigation information being settled as well as instantly outputting the message input from a message recorder.

In yet another preferred embodiment, the map data supply unit is constructed by a card-inserting structure. Thus, any map of any place as well as any information could be inputted to the navigation apparatus as a background data via cards storing pertinent information.

These and other objects, features and advantages of this invention will be apparent from the following more detailed description of the preferred embodiment of his invention as illustrated in the accompanying drawing.

DETAILED DESCRIPTION OF THE INVENTION

Figure 1:
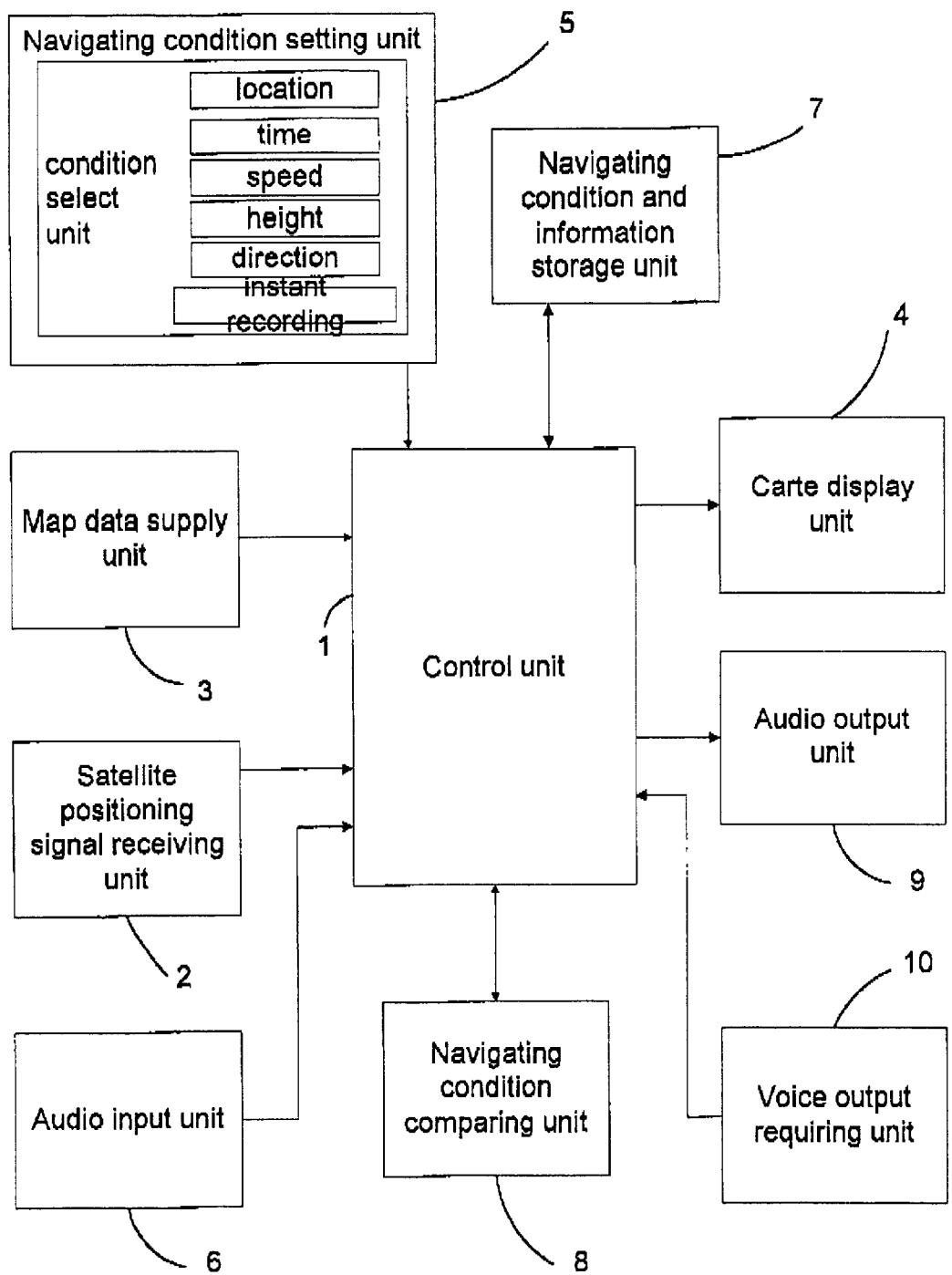
FIG. 1 is a block diagram shown the construction of the customer-settled navigation apparatus in accordance with a preferred embodiment of this invention.

As shown in FIG. 1, a customer-settled navigation apparatus in accordance with this invention generally comprises a control unit 1, a satellite positioning signal receiving unit 2, a map data supply unit 3, a display 4 serving as a carte display unit, a navigating condition setting unit 5, a microphone 6 serving as a audio input unit, a navigating information storage unit 7, a navigating condition comparing unit 8, a horn 9 serving as a audio output unit, and a voice output requiring unit 10. In addition, the navigating condition setting unit 5 includes a condition select unit 50, a location setting unit 51, a time setting unit 52, a speed setting unit 53, a height setting unit 54, a direction setting unit 55, and an instant recording setting unit 56.

The control unit 1 serves as a control and data process center used to perform any algorithm, analysis, comparison, input output, etc, as well as control other units.

The satellite positioning receiving unit 2 is used to receive satellite signals output from at least three satellites in a satellite positioning system (GPS), and send the signals to the control unit 1 so as to be processed for obtaining a real time condition including coordinate data representative of the place in which the navigation apparatus is located and its related data in accordance with the GPS signals. The coordinate data will soon be displayed in the display 4.

The map data supply unit 3 is one of card-inserting type in which a map memory card storing information and data pertinent to a particular area can be inserted. Thus, the map data corresponding to the area in which the navigation apparatus located could be supplied to the control unit via the map supply unit 3, and further be displayed in the display incorporating the coordinate data of the navigation apparatus. Moreover, any other type of information can also be input via the map data supply unit 3 in fight of actual application.

The display 4 which serves as the carte display unit is used to display the location of the navigation apparatus with respect to its corresponding area in accordance with the supplied map data and the coordinate data derived from the GPS signals. The display 4 can also be of the type capable of receiving signals from a light pen so as to perform the input of the navigating condition.

The navigating condition setting unit 5 is used for setting navigating condition. The so-called navigating condition can be a location, a time point, a speed, a height or a direction, etc. Moreover, the navigating condition setting unit 5 can also be set for directly inputting voice without setting the navigation condition, As shown in FIG. 1, the navigating condition setting unit 5 includes a condition select unit 50. Under the condition select unit 50, a location setting mode 51, a time setting mode 52, a speed setting mode 53, a height setting mode 54, a direction setting mode 55, and an instant recording setting mode 56 can be selected.

The microphone 6 serving as audio input unit is used for inputting audio navigating information in correspondence with the condition set by the navigating condition setting unit 5. The voice input by the microphone 6 will be digitized and compressed by the control unit 1 and then stored in the navigating information storage unit 7 corresponding to a flag in connection with the navigating condition being set.

The navigating information storage unit 7 is a digital memory device such as a violate memory or a non-violate memory, used for storing the navigating conditions being set and the navigation information being inputted.

The navigating condition comparing unit 8 is used to compare the navigating condition designated by the navigating condition setting unit 5 with the real-time condition derived from the GPS signals. Along with the reception of the GPS signals, the comparing unit 8 will continuously make such a comparison and determine whether both of the two conditions are matched to each other. For example, for a condition of location, the comparing unit 8 will compare the coordinate data derived from the GPS signals with the coordinate data of the designated location. For a condition of time, the comparing unit 8 will compare the time built in the apparatus or the time derived from the GPS signals with the time designated. For a condition of speed, the comparing unit 8 will compare the designated speed value with a speed value derived from the distance determined by plural GPS signals and the time elapsed under such a distance.

The horn 9 is used to output the voice navigating information stored in the storage unit 7. In case a match of condition comparison is obtained in unit 8, a flag indicating such a match will be sent out to the control unit 1 is for actuating the audio output unit 9 to output the voice navigating information corresponding to the navigating condition. The voice navigating information will be decompressed and D/A converted before being output by the horn 9. Therefore, any time the actual condition matches the designated condition, a customer-settled navigation information will be automatically output.

The voice output requiring unit 10 is used to actively output the voice information stored in the information storage unit 7 item by item or selectively. By means of this unit an user could check the stored navigating information and its corresponding navigating condition respectively output from the horn 9 and/or the display 4. For example, each navigating information could have a corresponding number and a corresponding condition, and thus the navigating information could be output by selecting an information number, by marking a coordinate on the map or by inputting a condition being designated. More particularly, in case the navigation apparatus is used as a message collect recorder, the message stored could be actively output by this unit or mode.

Figure 2:
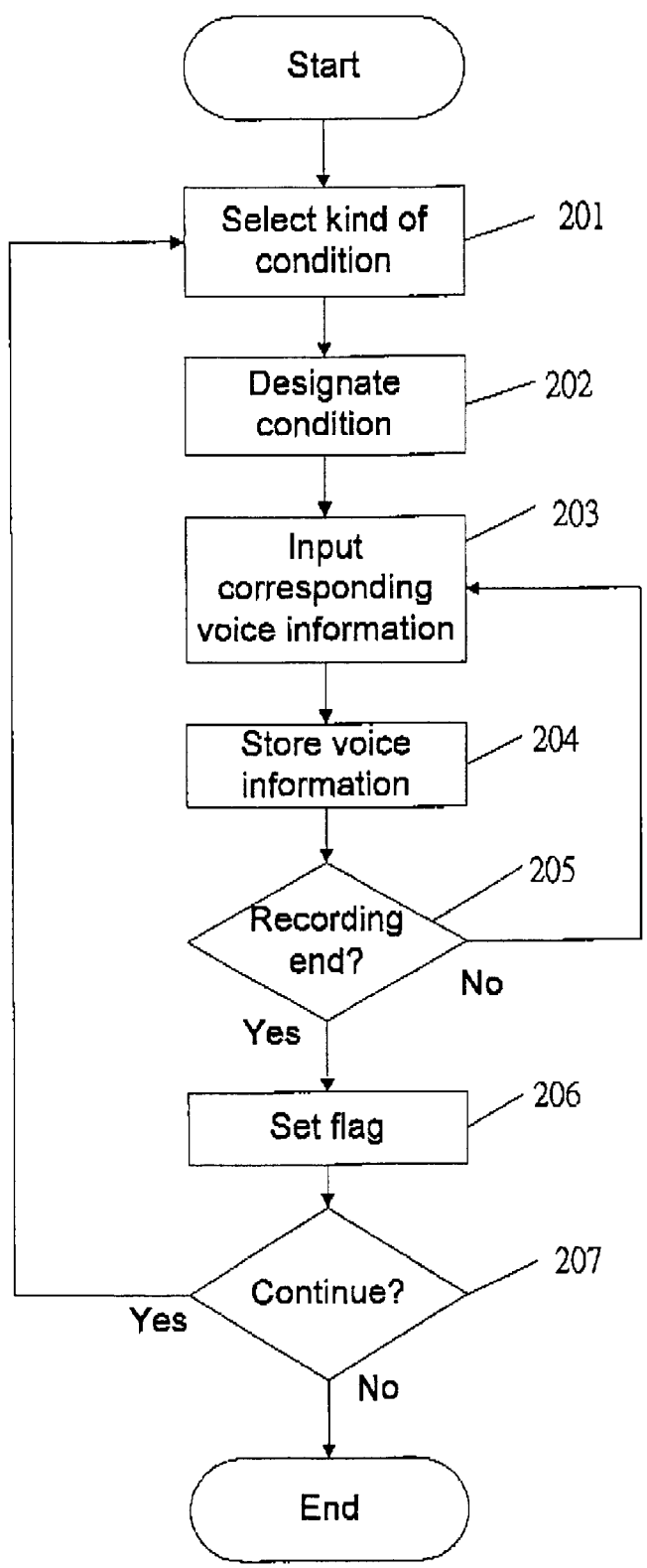
FIG. 2 is a flow chart depicting the navigating condition setting procedure of the customer settled navigation apparatus shown in FIG. 1.

FIG. 2 is a flow chart showing the setting procedure of the customer-settled navigation apparatus disclosed in this invention, After commencing the setting procedure, in step 201, the kind of the condition to be designated is selected. In this embodiment, there are six kinds of conditions that can be selected including location, time, speed, height, direction, and instant recording. When selection in step 201 is completed, the procedure enters step 202. In step 202, navigation condition is designated. In case a condition of location is selected, the coordinate data can be determined by the cursor in case a condition of time is selected, the time data can be input by means of keys. In case a condition of speed is selected, tie speed value data, the speed value can also be input by means of keys. The condition of height and direction is in the same way. In case the instant recording is selected, the setting of the navigation condition will be skipped and enter the next step 203. The navigation condition being designated will be stored into the storage unit 7 by the control unit 1, and being given a indicating flag P1(x).

In step 203, navigating information from the user can be input via the microphone 6. In step 204, the navigating information input by the user will be processed by the control unit 1 and then stored into the storage unit 7. In step 205, whether the input of the navigating information ends is determined. For example, a release of a recording key indicates the end of inputting. If no, the flow goes back to step 203 so as to continue receiving voice input. If yes, the flow goes to step 206 in which the control unit 1 will assign a flag P2(x) to the voice information being input. In step 207, whether designations of another conditions will be made is determined. If yes, the flow goes back to step 201 and repeats the follow steps thereof If no, the procedure of setting navigating information ends.

Figure 3:
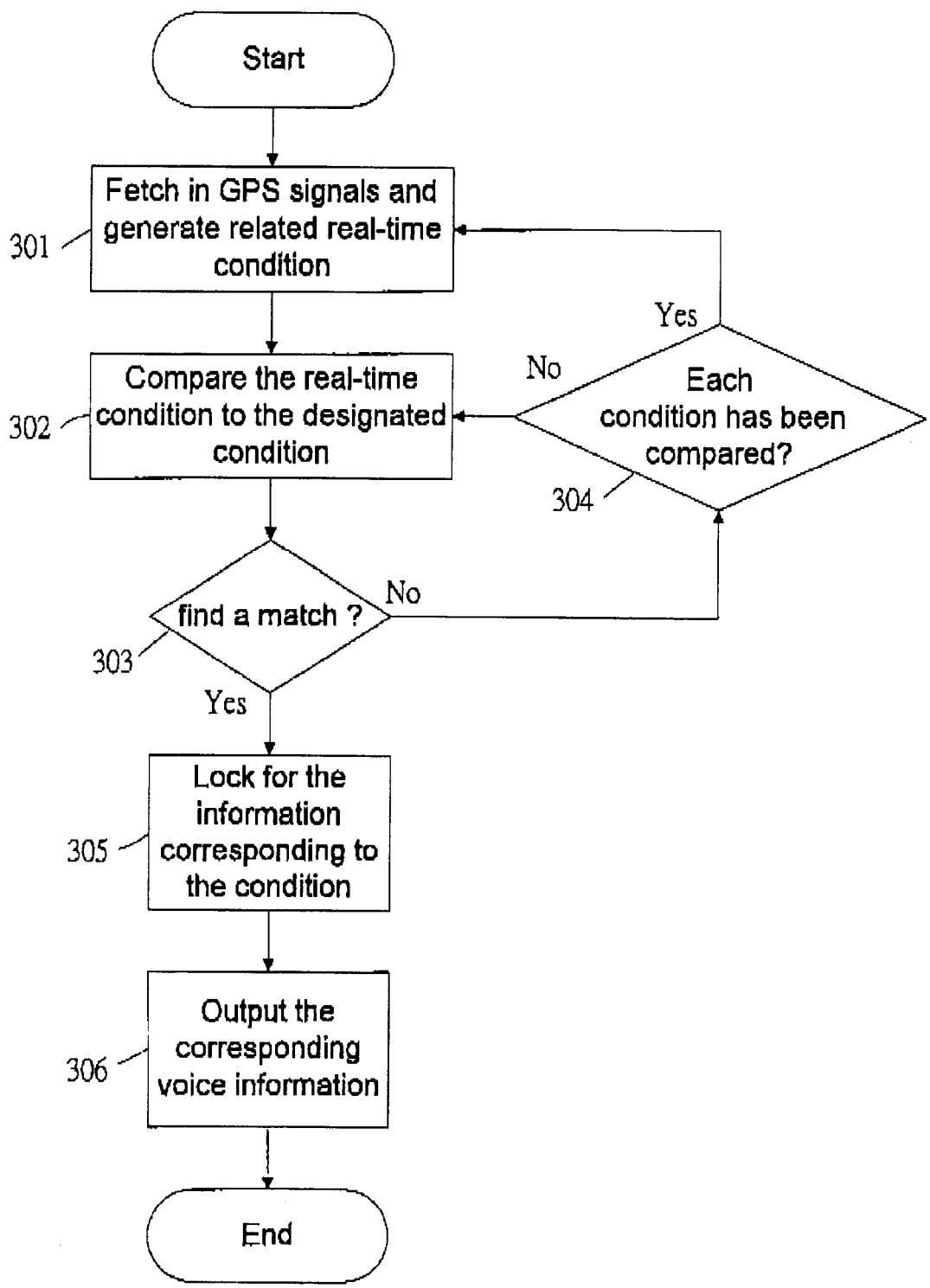
FIG. 3 is a flow chart depicting the navigating information output procedure of the customer-settled navigation apparatus shown in FIG. 1.

FIG. 3 is a flow chart depicting the procedure of automatically outputting the voice navigating information in the customer-settled voice navigation apparatus of this invention. Generally, the receiving of the GPS signals and the display of the location of the navigation apparatus in its related map is not a feature of this invention and thus its descriptions omitted herein. In the following, the description will be directed to how the audio navigation information is outputted with respect to the designated navigating condition in this invention. As shown in FIG. 3, after being started, the navigation apparatus in step 301 will fetch in the received GPS signals and generate a batch of related real-time data or real-time conditions, such as the coordinate of the navigation apparatus, the speed of the navigation apparatus, or the time at the instant. In step 302, the batch of real-time data or conditions are sent to the navigating condition comparing unit 8 so as to be compared to the conditions previously designated in terms of each kind of condition. Once a comparison of one kind of condition is executed, a judgment will be determined in step 303. If a match of such a designated condition is not found, the process passes to step 304 for judging whether another kind of condition shall be compared. If yes, the steps 302, 303, and 304 is repeated. If no, the procedure passes back to step 301 for fetching another batch of real-time data or conditions, However, in step 303 if a match of a designated condition is found, the procedure passes to step 305.

In step 305, the control unit 1 will search the corresponding navigation information via its corresponding flag P2(x) in accordance with the corresponding flag P1(x) of the designated condition being matched. In step 306 then the control unit 1 enables the audio output unit 9 to output the corresponding navigation information, i.e., the voice information previously inputted with respect to the designated navigation condition. After step 306, the procedure of automatically outputting voice navigation information will go back to step 304 for judging whether another kind of condition will be compared and repeat its following steps. In other words, after one voice navigation information is output, the output procedure will wait for a next output when another designated condition is found. However, the steps 305 and 306 can also be executed by another subroutine by the triggering of a flag resulted at a timing a match of a designated navigating condition is found in step 303. Thus, the comparison of the designated condition to the real-time condition would be accomplished more quickly.

Figure 4:
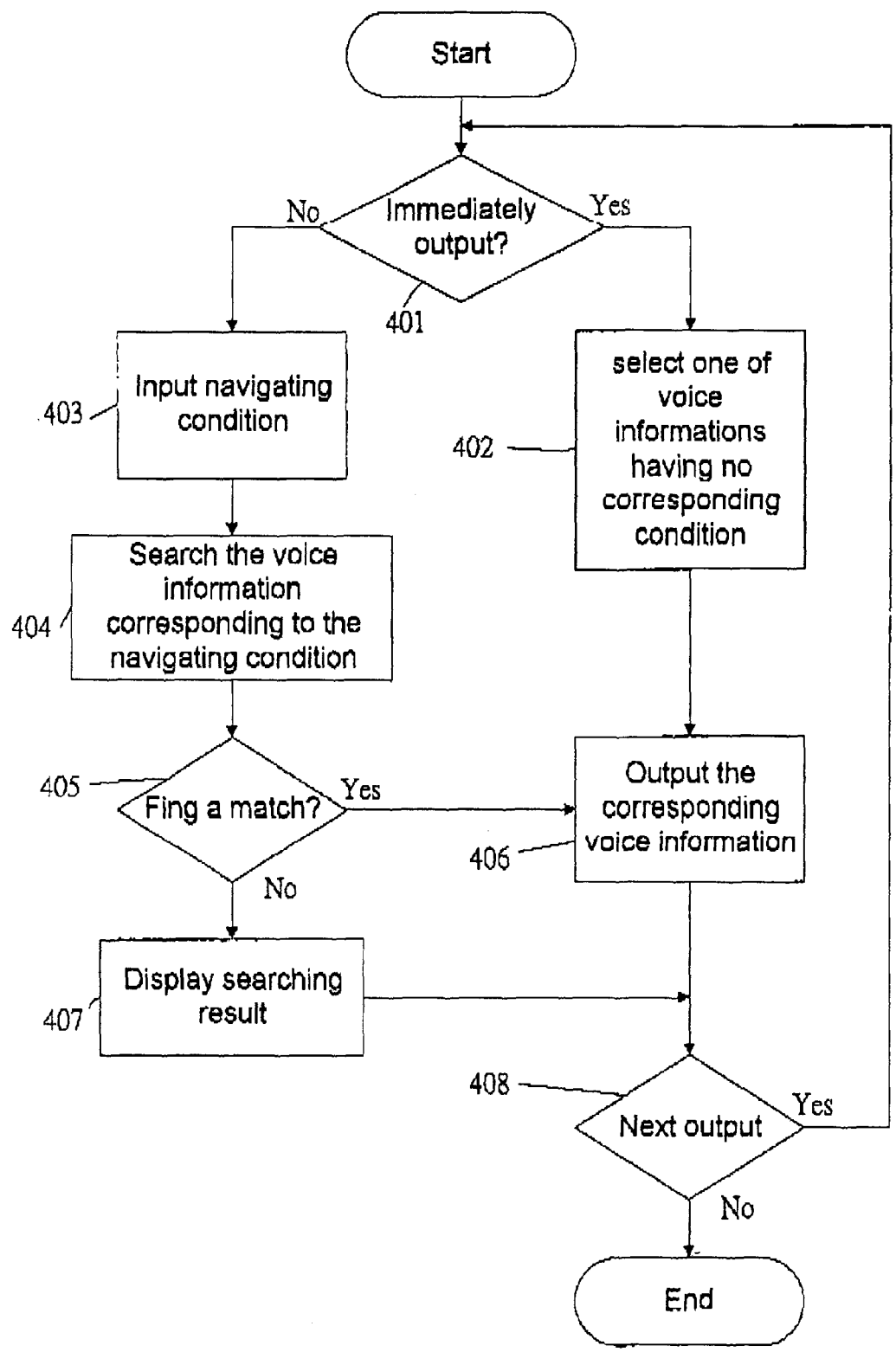
FIG. 4 is a flow chart depicting the voice output requiring control procedure of the customer-settled navigation apparatus shown in FIG. 1.

FIG. 4 is a flow chart depicting the procedure of the voice navigation apparatus of this invention under a voice output requiring mode. After starting, a judgment for whether a voice information will be immediately output is determined in step 401. If yes, it means that the navigation apparatus will be requested to output the information being recorded at it serving as a message collecting recorder, and the process passes to step 402. In step 402, one of the voice informations which has no corresponding navigating condition, i.e., any one voice information which has no corresponding flag P1(x), is provided for selection in the form of serial number. The step 406 then outputs the selected voice information in light of its corresponding flag which corresponds to the serial number being selected, In step 408, a judgment for whether another voice information will be requested is determined. If yes, the procedure goes back to step 401. If no, his procedure will be ended and than go back to main routine.

On other hand, if the answer in step 401 is no, the procedure passes to step 403. It means that the user wishes to check the voice navigating information having been inputted. In step 403, one navigating condition is requested to be inputted and then step 404 is continued. In step 404, the comparing unit 8 will compare the requested condition to the previously designated conditions so as to search its corresponding navigating information. In step 405, a determination about whether a corresponding navigating condition is found is executed. If yes, the procedure passes to step 406 so as to output corresponding navigating information by means of its corresponding flag and then performs its following steps as mentioned above. If no, step 407 is continued and a warning that no one corresponding navigating condition is found is displayed. It means that such a requested condition as well as its corresponding navigating information is not set. After step 407, step 408 is continued and performs the same operation as mentioned above.

In view of the above construction, a customer-settled voice navigation apparatus which incorporates with CPS receiving device, GPS navigation device, instant recording device, audio information setting device, and voice informing device is available. According to that apparatus, the user could settle any desired navigating information itself with respect to any location, areas timing, speeds height, and direction by means of an audio-recording manner at any place. Also, that apparatus could output audio navigating information previously recorded when the navigating condition designated by the user is matched. Moreover, the map data could be either a dot-matrix type of map data or a vector type of map data.

However, while the preferred embodiment of customer-settled navigation apparatus disclosed by this invention have been illustrated and described, it should be understood that variations will be apparent to those skilled in the art. Accordingly, this invention is not to be limited to the specific embodiments illustrated and described, and the true scope and spirit of this invention are to be determined by reference to the following claims.

What is claimed is:

1. A customer-set navigation apparatus comprising a satellite positioning signal receiving unit for receiving a GPS signal;

a control unit for controlling and processing the GPS signal received by the satellite positioning signal receiving unit to obtain a real-time condition including coordinate data representative of the place at which the navigation apparatus is located and related data in accordance with the GPS signal;

a map data supply unit for supplying to the control unit map data pertinent to the area in which the navigation apparatus is located;

a carte display unit for displaying the current location of the satellite positioning signal receiving unit from the map of the map data supply unit in accordance with the coordinate data and the map data;

a navigating condition setting unit for setting a navigating condition by a user;

an audio input unit for inputting any navigating information corresponding to the navigating condition via voice by the user;

a navigating condition comparing unit for determining whether the navigating condition matches the real-time condition; and an audio output unit for outputting corresponding voice navigating information stored in the storage unit according to the navigating condition at the timing the navigating condition matches the real-time condition.

2. The apparatus of claim 1, wherein the navigating condition setting unit includes a condition selecting unit for selecting different conditions being input.

3. The apparatus of claim 1, wherein the navigating condition setting unit includes a location setting unit for inputting coordinate data serving as the navigating condition.

4. The apparatus of claim 1, wherein the navigating condition setting unit includes a time setting unit for inputting time data serving as the navigating condition.

5. The apparatus of claim 1, wherein the navigating condition setting unit includes a speed setting unit for inputting speed data serving as the navigating condition.

6. The apparatus of claim 1, where the navigating condition setting unit includes a height setting unit for inputting height data serving as the navigating condition.

7. The apparatus of claim 1, wherein the navigating condition setting unit includes a direction setting unit for inputting direction data serving as the navigating condition.

8. The apparatus of claim 1, wherein the navigating condition setting unit includes an instant recording unit for immediately inputting audio information.

9. The apparatus of claim 1, wherein the map data supply unit is a card-inserting type.

10. The apparatus of claim 1, further comprising a voice output unit for checking the stored navigating information by a user and actively outputting the stored navigating information via voice.

* * * * *